Feb. 21, 1933.  T. STENHOUSE  1,898,101
PNEUMATIC GLASS FEEDER
Filed April 19, 1930
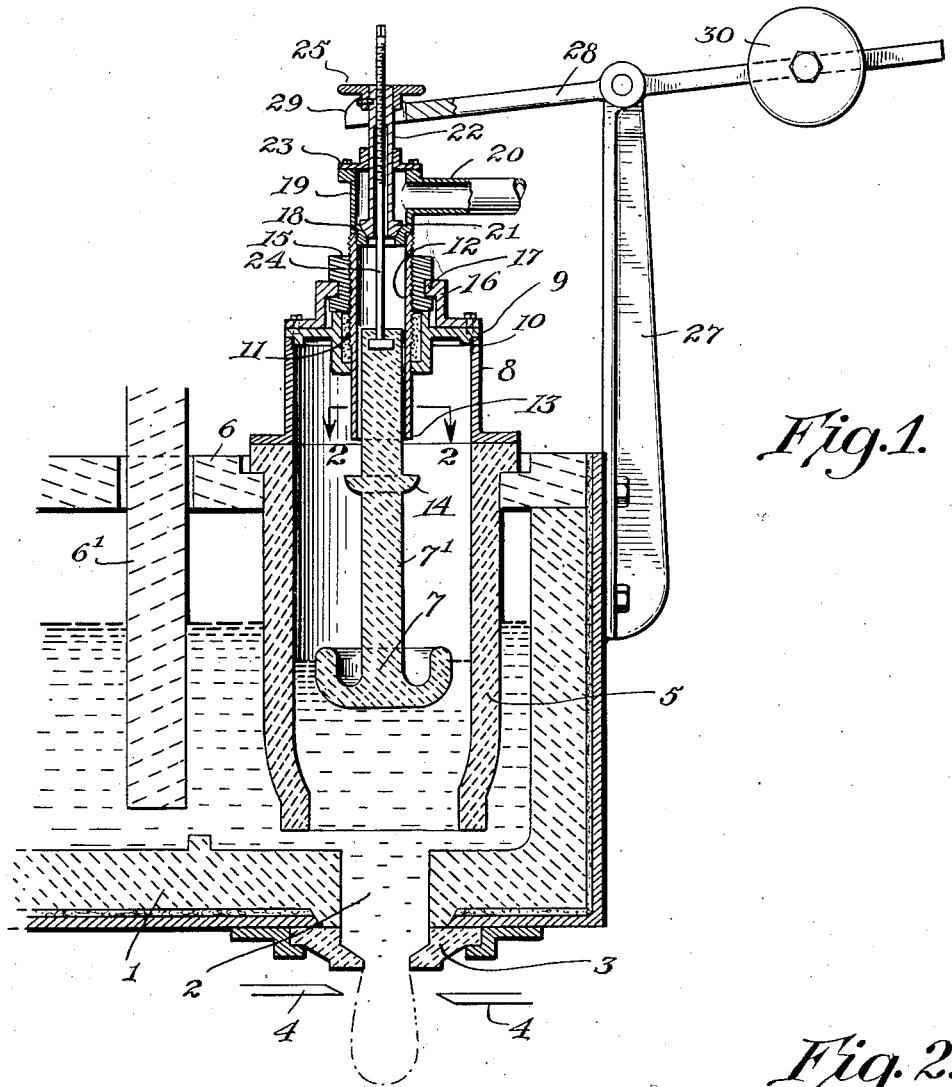
Fig. 1.
Fig. 2.
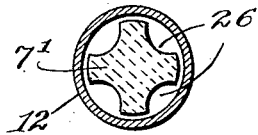
Inventor
Thomas Stenhouse
By
Eccleston + Eccleston
Attorneys Patented Feb. 21, 1933

1,898,101

UNITED STATES PATENT OFFICE

THOMAS STENHOUSE, OF WASHINGTON, PENNSYLVANIA, ASSIGNOR TO HAZEL-ATLAS GLASS CO., OF WHEELING, WEST VIRGINIA, A CORPORATION OF WEST VIRGINIA

PNEUMATIC GLASS FEEDER

Application filed April 19, 1930. Serial No. 445,789.

The invention relates generally to that type of feeder in which glass charges are formed by periodically increasing and decreasing the pressure of air on the body of glass. Feeders of the pressure and vacuum type are old and well known; and have been very successful in commercial operation. However, such feeders must be operated with care; for otherwise it is possible that the body of glass may gradually rise, due to a building up of vacuum, or may gradually fall, due to a building up of pressure.

In accordance with the present invention, means is provided to prevent the glass from rising above a predetermined level, or from falling below a predetermined level. That is, the degree of vacuum may be increased or decreased, or the duration of the application of the vacuum may be increased or decreased, or the viscosity of the glass may increase or decrease, yet the glass will not be raised above a certain predetermined level, by reason of mechanism which is controlled by the level of the glass. Likewise, the pressure on the glass may be increased or decreased, and the duration of the application of pressure may be increased or decreased, and the viscosity of the glass may be increased or decreased, without the glass being lowered below a certain predetermined level. In other words, in the present invention, the rise of the glass to a certain level will automatically cause the application of vacuum to cease; and the fall of the glass to a certain level will cause the application of pressure to cease; the controlling means being operated by the level of the glass.

While in accordance with this invention the glass is automatically prevented from rising above a certain level, or falling below a certain level, yet the invention also provides for varying the level to which the glass may rise or fall, for varying the period during which the vacuum is applied, the period during which the pressure is applied, etc.

I do not present herein claims drawn to the broad subject-matter involved in the invention; such claims being presented in my application Serial No. 444,808, filed April 16, 1930.

The particular structure disclosed herein will now be described, reference being had to the accompanying drawing, in which Figure 1 is a vertical sectional view of the feeder and flow spout; and Figure 2 is a detail horizontal sectional view taken on line 2—2 of Figure 1.

Numeral 1 indicates a conventional flow spout having a flow orifice 2 provided with a removable bushing 3. Conventional shears, diagrammatically illustrated and referred to by numeral 4, are arranged below the flow orifice for severing the formed charges, which then drop into molds, in the usual manner.

Mounted in the flow spout, in alignment with the flow orifice, is the usual pressure and vacuum tube 5, supported by the cover 6 of the flow spout, and which projects downwardly into the glass to a point adjacent the floor of the flow spout. The glass normally rises in this tube to the level of the glass in the flow spout and tank. The flow spout may also be provided with the ordinary vertically adjustable gate 6', for controlling or entirely shutting off the flow of glass. All of the structure thus far described is old and well known in the glass art.

Numeral 7 refers to a float of refractory material, which is adapted to float on the glass in the tube 5, and rise and fall with the glass. The lower portion of the float may be of any desired shape, such as an ordinary disc, or it may have a ball shape, etc.; the only essential being that it be so shaped as to rise and fall with the glass. In the form illustrated herein the float is of a general cup shape.

A metallic casing or housing 8 forms an extension of the tube 5; the housing and tube having an airtight connection. The upper end of the housing is closed by a stuffing box plate 9 which is secured to the housing in any desired manner, as by threads 10. The plate 9 carries a stuffing box 11, through which passes a cylindrical valve seat body 12. The lower end of the valve seat body constitutes a valve seat 13 adapted to cooperate with the valve 14 carried by the shank 7' of the float 7. The valve 14 is shown here as an integral part of the refractory shank 7', but obviously it may be of any desired construction, such as a metallic valve mounted on the refractory shank. As will appear hereinafter, the application of vacuum is shut off when the glass and float rise sufficiently to seat the valve 14.

For the purpose of vertically adjusting the valve seat body 12, it is exteriorly threaded, and in engagement therewith is a nut 15 which is held against vertical movement by means of a yoke 16 which is bolted or otherwise secured to the plate 9; the yoke having an inturned flange 17 which fits into an annular groove formed in the nut. Thus by the rotation of the nut 15, the valve seat body 12 is raised or lowered to the desired extent.

Threaded into the upper end of the valve seat body, is a valve seat 18. In the specific structure illustrated herein, this valve seat forms an integral part of a pressure and vacuum drum. Connected with this drum is a pipe 20 leading from sources of pressure and vacuum, not shown. It will be understood, of course, that an ordinary distributor controls the alternate application of pressure and vacuum through pipe 20. It is unnecessary to illustrate the distributor, as they have been known for many years, and per se form no part of the present invention.

A valve 21 is adapted to cooperate with the valve seat 18 to automatically shut off the pressure when the glass and float have fallen to a predetermined point. This valve 21 is carried by a valve stem 22 which is slidably mounted in a cap 23 which forms a closure for the upper end of the drum 19; the cap being attached to the drum by bolts, or other attaching means. The valve stem 21 is threaded on a rod 24 which is connected to the shank 7' of the float 7. Thus the valve may be adjusted vertically by rotating the valve stem relative to the rod 24. To facilitate the adjustment of the valve, its stem is preferably provided with a disc hand wheel 25, which is pinned or otherwise removably attached to the valve stem.

In the preferred construction, the shank 7' of the float 7, is provided with longitudinally extending grooves 26, above the valve 14; as illustrated in Figure 2. These grooves permit a more free application of vacuum and pressure to the glass within the tube 5.

The refractory element 7 is of such specific gravity that it will float on the glass; but in order to take care of the valves and associated parts, friction, etc., it is necessary to provide some kind of counterbalance. For this purpose, I provide a bracket 27, which is attached to the frame of the flow spout, and which carries at its upper end a lever 28. One arm of the lever has a fork 29 which engages under the hand wheel 25, while the other arm of the lever carries a counterweight 30, the position of which may be adjusted. The bracket 27 is shown as mounted on the end of the flow spout, but obviously it could be mounted on either side thereof.

If it should become necessary to replace the float, or repair any of the valve mechanism associated therewith, the whole mechanism may be removed as a unit, by merely unscrewing the plate 9.

The operation of the feeder will now be briefly described.

The distributor will, as in the usual practice, admit air under pressure to the pipe 20, at the proper instant. This air under pressure will flow freely past the valve 21, and thence into the tube 5, where it will exert its force on the glass therein.

This pressure acting on the glass in the tube will force the glass downward, thereby accelerating the flow of glass through the orifice 2. The extent to which the level of the glass is lowered in the tube will depend upon the pressure of the air admitted to the tube, the length of time the glass is subjected to the pressure, and the temperature and viscosity of the glass.

In pneumatic feeders of the prior art, it has been impossible to automatically fix the level to which the glass in the tube is permitted to fall. In accordance with the present construction, however, as soon as the glass has fallen to a predetermined level, or in other words, when the desired amount of glass has passed through the bushing 3, the pressure will be automatically shut off. This highly desirable function is accomplished by the float 7 which floats downwardly with the glass, and its downward movement lowers the valve 21 accordingly. When the float has descended to the desired point the valve 21 will close against its seat 18, thereby preventing the further admission of air under pressure to the tube 5. As shown in Figure 1, the glass has fallen to the desired level, and the valve 21 has seated.

The valve seat 18 may be adjusted up or down by the rotation of the nut 15, as hereinbefore described. By adjusting the valve seat up or down, the level to which the glass is permitted to descend, is easily varied. Or, the level to which the glass is permitted to descend may be maintained, and the extent of rise and fall of the glass may be varied by adjusting the distance between the valves 21 and 14; this adjustment being made by the handwheel 25. By adjusting both the valve seat and the valves, any intermediate action may be obtained.

At the proper instant the distributor will, in the usual manner, cause suction to be applied to the pipe 20, as by a vacuum pump, vacuum tank, etc. The air will thus be withdrawn from the tube 5, and the glass will rise therein. As stated above, in pneumatic feeders of the prior art there has been no way of automatically determining the extent to which the glass falls in the tube; and likewise it was impossible in such prior feeders to automatically determine the extent to which the glass would rise under vacuum. In the present feeder the glass cannot rise above a predetermined level no matter how high the degree of vacuum may be, how long it is applied, or what the temperature and viscosity of the glass may be. For, as soon as the glass rises to a predetermined level, the float, which rises with the glass, will cause the valve 14 to engage its seat 13 and thus shut off communication between the tube 5 and the source of vacuum. The valve seat 13 may be adjusted vertically by the nut 15.

Any variations in the temperature and viscosity of the glass, are automatically taken care of in the present feeder, for if the temperature and viscosity change so that the weight of the charge would ordinarily be reduced, the pressure will automatically continue in action longer, thus obtaining the same weight of charge; and if the temperature and viscosity change so that ordinarily the charge would be overweight, the duration of the pressure will automatically be reduced accordingly. So that while the present invention has been described generally as automatically controlling the pressure and vacuum in accordance with the rise and fall of the glass, it will be understood that it is substantially the equivalent of automatically controlling the pressure and vacuum to maintain the desired weight of charges.

The level to which the glass is permitted to rise, may be varied as desired, by adjusting the valve seat 13 up or down. Or the level to which the glass is permitted to rise may be maintained, and the extent of rise and fall may be varied by adjusting the distance between the valves 14 and 21. Any intermediate action may be obtained by adjusting both the valve seat and the valves.

The severing of the charges has not been described; it being understood that the charges, when formed, are severed in the usual manner.

The particular apparatus disclosed herein may be changed and modified in numerous respects, without departing from the spirit of the invention, and all such changes and modifications are intended to be included within the scope of the appended claims; it being understood that the claims drawn to the broad inventions involved, such as automatically regulating the level of the glass, regulating the level of the glass by the movement of the glass, controlling the duration of pressure application by the level of the glass, controlling the duration of vacuum application by the level of the glass, etc., are presented in my application Serial No. 444,808, referred to hereinbefore.

What I claim is:

1. A pneumatic glass feeder including a flow spout having a flow orifice, a pressure and vacuum tube projecting downwardly into the glass and in substantial alignment with the flow orifice, a valve seat body mounted above the tube and communicating therewith, means for alternately connecting the interior of the valve seat body with pressure and vacuum, a valve seat adjacent each end of the valve seat body, a float resting on the glass in the tube, and valves operated by the movement of the float and adapted to cooperate with the valve seats to control the pressure and vacuum.

2. A pneumatic glass feeder including a flow spout having a flow orifice, a pressure and vacuum tube projecting downwardly into the glass and in substantial alignment with the flow orifice, a valve seat body mounted above the tube and communicating therewith, means for alternately connecting the interior of the valve seat body with pressure and vacuum, a valve seat adjacent each end of the valve seat body, means for vertically adjusting the valve seat body, a float resting on the glass in the tube, and valves operated by the movement of the float and adapted to cooperate with the valve seat to control the vacuum and pressure.

3. A pneumatic glass feeder including a flow spout having a flow orifice, a pressure and vacuum tube projecting downwardly into the glass and in substantial alignment with the flow orifice, a valve seat body mounted above the tube and communicating therewith, means for alternately connecting the interior of the valve seat body with pressure and vacuum, a valve seat adjacent each end of the valve seat body, means for vertically adjusting the valve seat body, a float resting on the glass in the tube, valves operated by the movement of the float and adapted to cooperate with the valve seat to control the vacuum and pressure, and means for varying the distance between the valves.

4. A pneumatic glass feeder including a flow spout having a flow orifice, a tube projecting downwardly into the glass and in substantial alignment with the flow orifice, a drum adapted to alternately communicate with sources of pressure and vacuum, said drum communicating with the interior of the tube, a valve adapted to open and close communication between the drum and the interior of the tube, a valve stem carrying said valve and projecting upwardly beyond the drum, a counterbalance lever connected with the valve stem beyond the drum, a float resting on the glass in the tube, and a rod having its lower end connected to the float and its upper end threadedly connected with the valve stem.

5. A pneumatic glass feeder including a flow spout having a flow orifice, a tube projecting downwardly into the glass and in substantial alignment with the flow orifice, a drum adapted to alternately communicate with sources of pressure and vacuum, a valve seat associated with the drum, a valve in said drum and adapted to cooperate with the valve seat, a valve seat body projecting downwardly from the drum and adapted to communicate with the drum and the tube, a valve seat at the lower end of the valve seat body, a valve adapted to cooperate with the last-mentioned valve seat, a float resting on the glass in the tube and operatively connected with both of said valves.

6. A pneumatic glass feeder including a flow spout having a flow orifice, a pressure and vacuum tube projecting downwardly into the tube in substantial alignment with the flow orifice, a drum adapted to alternately communicate with sources of pressure and vacuum, a valve seat associated with the drum, a valve in said drum and adapted to cooperate with the valve seat, a valve seat body projecting downwardly from the drum and adapted to communicate with the drum and the tube, a valve seat at the lower end of the valve seat body, a valve adapted to cooperate with the last-mentioned valve seat, a float resting on the glass in the tube and operatively connected with both of said valves, means for vertically adjusting the valve seats, means for varying the distance between the valves, and means for counterbalancing the valves and associated movable parts.

THOMAS STENHOUSE.